G. N. SAEGMULLER.
SINGLE FIELD DOUBLE SIGHTING TELESCOPE.
APPLICATION FILED JAN. 9, 1911.
991,652.
Patented May 9, 1911.
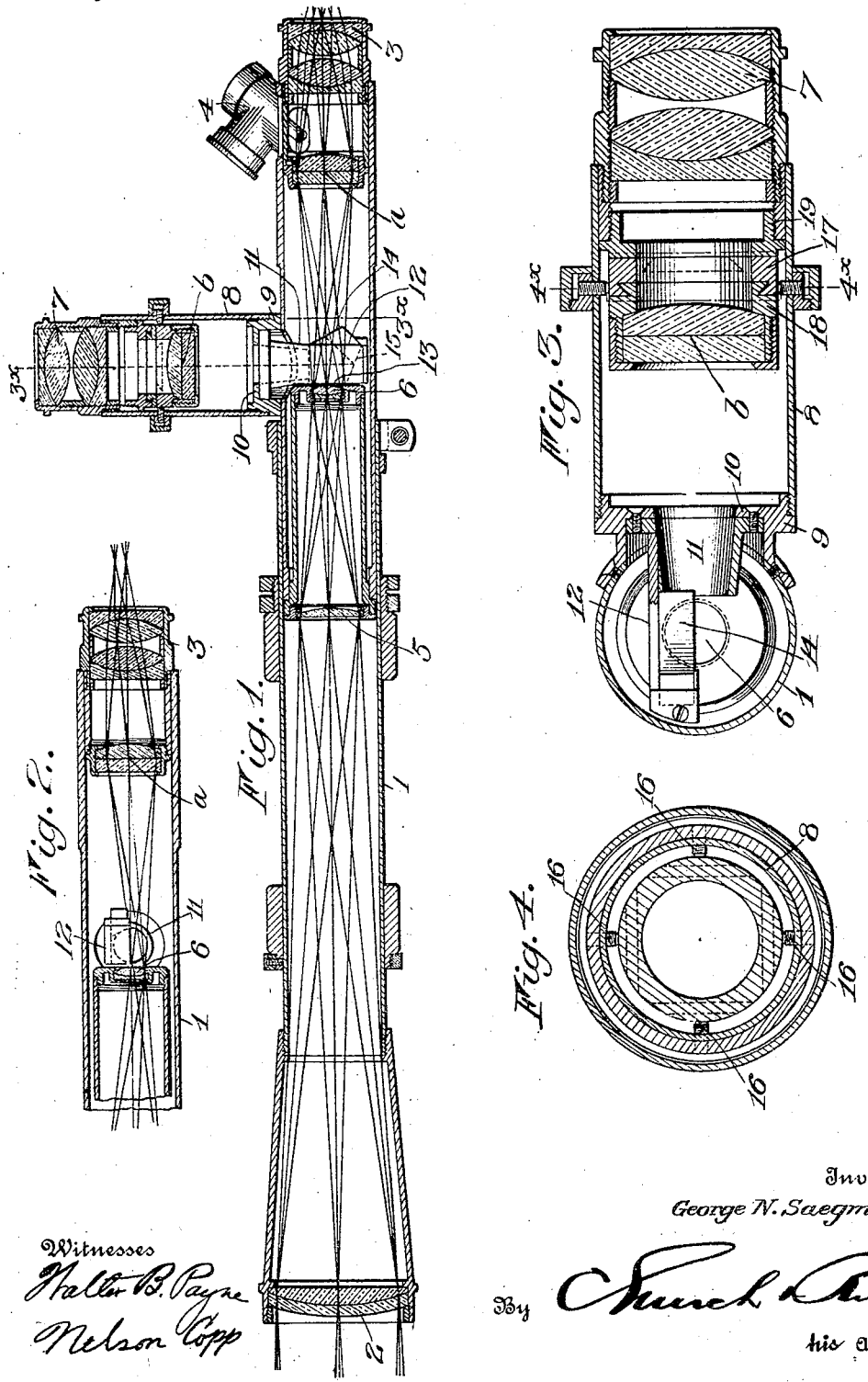
Witnesses
Walter B. Payne
Nelson Copp
Inventor
George N. Saegmuller
By
his Attorneys

UNITED STATES PATENT OFFICE.

GEORGE N. SAEGMULLER, OF ROCHESTER, NEW YORK, ASSIGNOR TO BAUSCH & LOMB OPTICAL COMPANY, OF ROCHESTER, NEW YORK, A CORPORATION OF NEW YORK.

SINGLE-FIELD DOUBLE-SIGHTING TELESCOPE.

991,652.     Specification of Letters Patent.     Patented May 9, 1911.

Application filed January 9, 1911. Serial No. 601,516.

*To all whom it may concern:*

Be it known that I, GEORGE N. SAEGMULLER, of Rochester, in the county of Monroe and State of New York, have invented certain new and useful Improvements in Single-Field Double-Sighting Telescopes; and I do hereby declare the following to be a full, clear, and exact description of the same, reference being had to the accompanying drawings, forming a part of the specification, and to the reference-numerals marked thereon.

My present invention has for its object to provide a telescope adapted to be used particularly in connection with ordnance, in which provision is made whereby an officer or instructor may observe in the instrument the same view as that obtained by the gunner while he is manipulating his gun to train it upon a target.

In carrying out my invention I provide a single field double sight telescope having two separate and distinct eye-pieces, the one for the gunner being preferably arranged in axial alinement with the objective lens of the instrument, while the one adapted to the use of the officer or instructor projects at an angle to the telescope, the means for accomplishing the proper positioning of the image of the object, as viewed in both eye-pieces, being accomplished by reflecting or directing a portion of the light rays into the officer's eye-piece, while the remaining light rays portray a clear view of the object in the gunner's eye-piece.

To these and other ends the invention consists in certain improvements and combination of parts, all as will be hereinafter more fully described, the novel features being pointed out in the claims at the end of the specification.

In the drawings: Figure 1 is a longitudinal sectional view of a telescope constructed in accordance with the invention; Fig. 2 is a similar view of the eye-piece end of the instrument, taken at right angles to the section shown in Fig. 1; Fig. 3 is a sectional view taken on the line 3×—3× of Fig. 1, and Fig. 4 is a cross-sectional view taken on the line 4×—4× of Fig. 3.

Similar reference numerals in the several figures indicate similar parts.

In the illustrations employed for showing the present embodiment of my invention 1 indicates the tubular shell of the telescope provided at its forward end with the objective lens 2, and at its opposite extremity with the eye-piece or ocular 3 containing the usual or any preferred arrangement of eye-piece lenses in fixed relation to which the usual cross hairs are located. The cross hairs are not illustrated but it will be understood that they appear at the point *a* and are illuminated by a source of light arranged in the casing 4. It is especially important in an instrument of this character which is to be used as a gun sight, that the images of objects viewed by the operator appear in their normal position, and for this reason I interpose between the objective and the eye-piece a system of lenses for restoring the image of the object to the normal position of the object itself, which consists in reversing the image focused by the objective lens 2. In the present illustrations this reversing system of lenses comprise a collective lens 5 and a projecting lens 6 spaced therefrom and focusing the image at the cross hairs *a*.

It will be observed that all of the lenses described above are arranged in axial alinement, and the eye-piece 3, being directly in rear of the objective 2, is the one most convenient to be used by the gunner or marksman, and for simplicity in description I have termed it the primary ocular.

In carrying out my invention I provide the instrument with the secondary ocular 7, for the use of the officer or instructor, which comprises a similar but independent system of eye-piece lenses for viewing an image in conjunction with the cross hairs located at the point marked *b*. This secondary eyepiece is arranged with the axis of its lenses extending at an angle to the major longitudinal axis of the telescope. In other words the secondary ocular projects laterally of the body or shell 1 of the instrument, to which it is connected by a tube 8 surrounding an aperture in the side wall of the shell 1, said parts being preferably connected by a suitable ring shaped fitting 9 having an inwardly extending flange 10 provided with an aperture surrounded by a thimble 11 having an arm 12 projecting across the shell 1, and supporting a suitable means employed for collecting a portion of the rays of light passing through the body of the instrument and reflecting them into the secondary ocular. The latter is preferably arranged with the axis of its lenses at right angles to the axis of the lens system of the telescope, and in proximity to the primary ocular 3, which places it in rear of the reversing system of lenses 5 and 6, and since rays of light from all points of the field covered by the objective 2 pass through all points of the lens 6, a portion of the light rays at this point may be intercepted and deflected into the secondary ocular, while the remaining light rays pass into the primary ocular and the partial rays received in both of the eye-pieces still produce a complete image of the object. In order, however, to properly position the image in the secondary ocular it is desirable that coacting reflecting surfaces be employed in bending the rays of light so that the object viewed in this eye-piece will not be reversed from right to left. This object may be satisfactorily accomplished by employing a prism of sufficient thickness to cover approximately one-half of the lens 6, which may be rigidly supported on the arm 12, as shown in Fig. 3. This prism has an entrant surface 13 arranged in proximity to the lens 6 and coacting reflecting surfaces 14 and 15, the latter being positioned to receive the light rays reflected from the former and to direct them into the secondary ocular 7. For convenience in adjustment one of the lenses of the secondary ocular is capable of horizontal and vertical movement by means of set-screws 16 bearing against cross slides 17 and 18 which are guided upon each other, the former being guided upon the barrel 19 of the ocular.

An instrument constructed in accordance with my invention is particularly adapted to be used as a gun sight, as it enables two persons to observe like images of the same object, but it will, of course, be understood it is equally well adapted for other uses for which telescopes are employed.

I claim as my invention:

1. The combination with a telescope having objective and eye-piece system of lenses, of a secondary set of eye-piece lenses arranged with their axis extending laterally of the axis of the lens system and means located in proximity to and at one side of said axis for intercepting and reflecting part of the pencil of light rays, passing through the lens system, into said second eye-piece.

2. In a telescope, the combination with an objective lens, and two eye-piece systems of lenses, one of which is arranged in the axis of the objective, the other being disposed at an angle to said axis, of a prism arranged to receive and direct part of the rays traversing said axis into the second eye-piece.

3. In a double sighting telescope, the combination with a single objective lens and two separate systems of ocular lenses, one system located in axial alinement with the objective lens, the second being disposed with its axis extending laterally of the said axis of the objective lens, of a prism located with its surfaces arranged relatively to the axes of the two lens systems to intercept part of the light rays, passing through the objective, and project them into the second ocular lens system.

4. In a double sighting telescope, the combination with a tubular shell having an objective lens located at its outer end and an ocular arranged at its opposite extremity, of a branch tube projecting from one side of the shell, a second ocular mounted therein, a prism interposed between the objective lens and its alined ocular at one side of the axis of said lenses for collecting a portion of the light rays passing through the telescope, said prism having coacting reflecting surfaces, one of which is disposed relatively to the second ocular to direct said light rays into it.

5. In a double sighting telescope, the combination with a tubular shell provided at one side with an aperture, objective and ocular lenses disposed at opposite ends of said shell, of a branch tube extending laterally from the shell and surrounding the aperture therein, and a second ocular supported in said tube, an arm projecting into the shell at one side of the aperture, and a reflector supported on the arm and arranged to intercept a portion of the light rays passing through the shell and direct them into the second ocular.

6. A double sighting telescope comprising an objective lens and an ocular arranged in alinement with the axis thereof, a second ocular extending laterally of the axis of said objective lens and a prism having an entrant surface, two reflecting surfaces and an emergent surface disposed at one side of the axis of the objective lens and receiving a portion of the light rays deflecting them from one reflecting surface to the other and finally directing them into the second ocular.

7. A double sighting telescope comprising an objective lens, a primary ocular arranged in axial alinement therewith and a system of lenses for erecting an image interposed between the objective and ocular, a secondary ocular located between the primary ocular and said erecting system of lenses and disposed with its axis at an angle to the axis of the first mentioned lenses and means for reflecting a portion of the light rays emerging from the erecting system of lenses into the secondary ocular.

8. A double sighting telescope comprising an objective lens and a primary ocular in axial alinement therewith and a system of lenses interposed between them for erecting an image comprising a collective lens and a projecting lens, a prism arranged to receive a portion of the light rays emerging from the projecting lens and having a reflecting surface, and a secondary ocular receiving said reflected rays.

9. A double sighting telescope comprising an objective lens, a primary ocular in axial alinement therewith and a system of lenses interposed between them for erecting an image comprising a collective lens and a projecting lens, a prism arranged to receive a portion of the light rays emerging from the projecting lens, having two coacting reflecting surfaces projecting said rays in a direction laterally of the axis of said lenses and a secondary ocular receiving said reflected rays.

GEORGE N. SAEGMULLER.

Witnesses:
WILLIAM G. WOODWORTH,
DANIEL M. SMITH.